(12) United States Patent
Phely et al.

(10) Patent No.: US 6,981,563 B2
(45) Date of Patent: Jan. 3, 2006

(54) VEHICLE DRIVE DEVICE WITH FLEXIBLE CRAWLER AND VEHICLE THUS OBTAINED

(75) Inventors: Olivier Phely, Thenisy (FR); Denis Piou, Villeblevin (FR)

(73) Assignee: OTICO, Longueville (FR)

( * ) Notice: Subject to any disclaimer, the term of this patent is extended or adjusted under 35 U.S.C. 154(b) by 39 days.

(21) Appl. No.: 10/607,267

(22) Filed: Jun. 27, 2003

(65) Prior Publication Data

US 2004/0017107 A1    Jan. 29, 2004

(30) Foreign Application Priority Data

Jul. 5, 2002    (FR) .................................. 02 08490

(51) Int. Cl.
*B62D 55/04*    (2006.01)
(52) U.S. Cl. ..................... 180/9.21; 180/9.26; 305/121
(58) Field of Classification Search ................. 180/9.1, 180/9.21, 9.26, 9.28, 9.3; 305/116, 120, 305/121, 122
See application file for complete search history.

(56) References Cited

U.S. PATENT DOCUMENTS

| | | | |
|---|---|---|---|
| 3,710,896 A * | 1/1973 | Wagner | 180/9.21 |
| 4,865,141 A * | 9/1989 | Gey | 180/9.26 |
| 5,273,126 A | 12/1993 | Reed et al. | |
| 5,343,960 A | 9/1994 | Gilbert | |
| 6,006,847 A * | 12/1999 | Knight | 180/9.26 |
| 6,095,275 A * | 8/2000 | Shaw | 180/185 |
| 6,164,399 A * | 12/2000 | Bays | 180/9.5 |
| 6,199,646 B1 * | 3/2001 | Tani et al. | 180/9.21 |
| 6,615,939 B1 * | 9/2003 | Karales et al. | 180/9.26 |
| 6,640,915 B2 * | 11/2003 | Haringer | 180/9.26 |
| 2002/0017403 A1 | 2/2002 | Phely | |

FOREIGN PATENT DOCUMENTS

DM    1630206    7/1971
EP    1110851    6/2001

* cited by examiner

*Primary Examiner*—Avraham Lerner
(74) *Attorney, Agent, or Firm*—Dennison, Schultz, Dougherty & MacDonald

(57) ABSTRACT

The drive device of the invention comprises a ready to fit unit or kit, for installing in a detachable manner on one side of a chassis of a motor vehicle. The unit comprises a flexible crawler looped round a drive wheel adapted to be mounted on a drive hub of the vehicle and round a tension wheel carried by a support frame, which comprises an internal part adapted to be secured in a detachable manner on the chassis remote from the drive shaft, an intermediate part adapted to carry the tension wheel and an external part carrying a bearing for the drive wheel. The invention is particularly of use for transforming vehicles with four drive wheels for crawler operation.

11 Claims, 3 Drawing Sheets

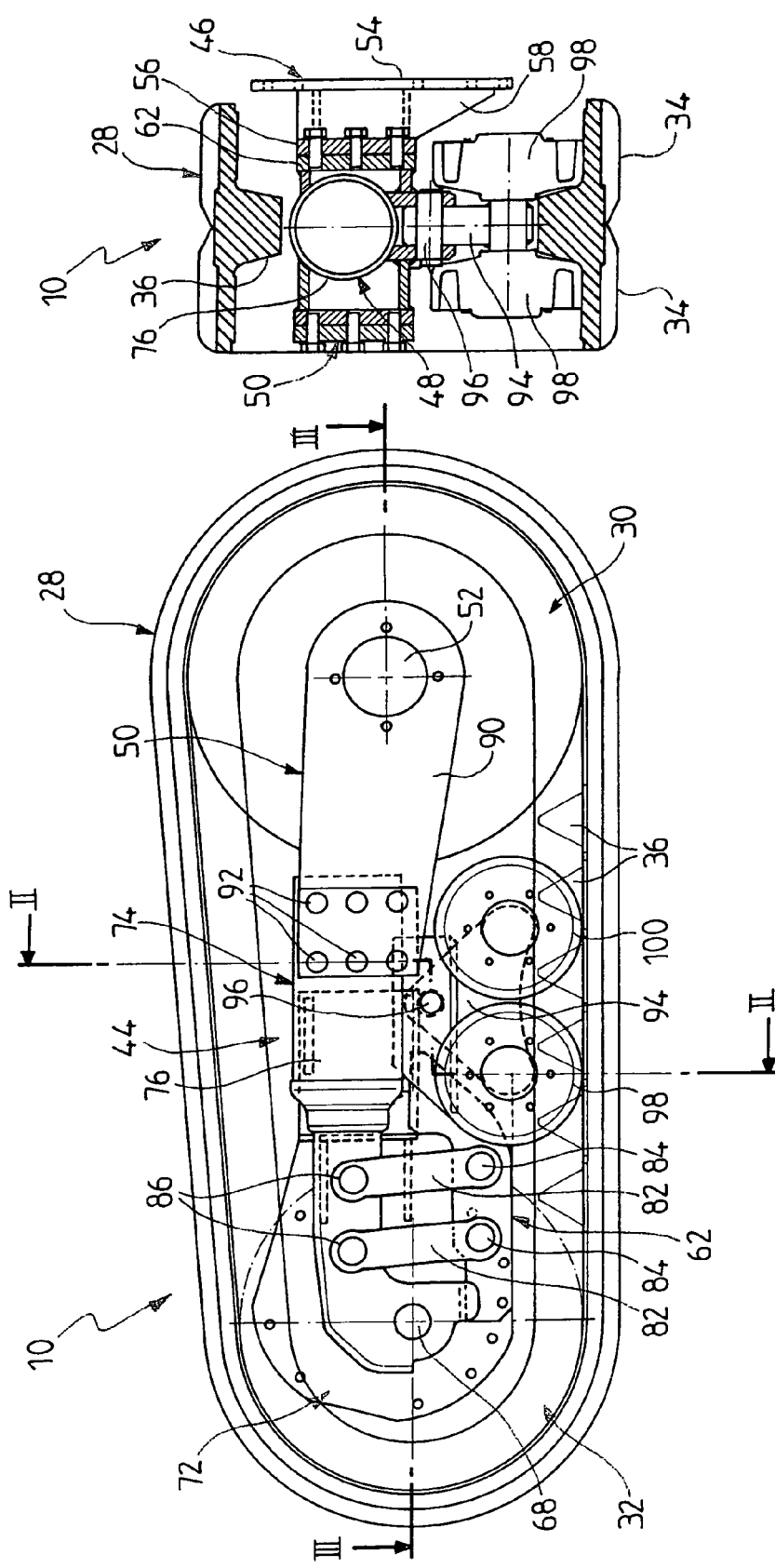

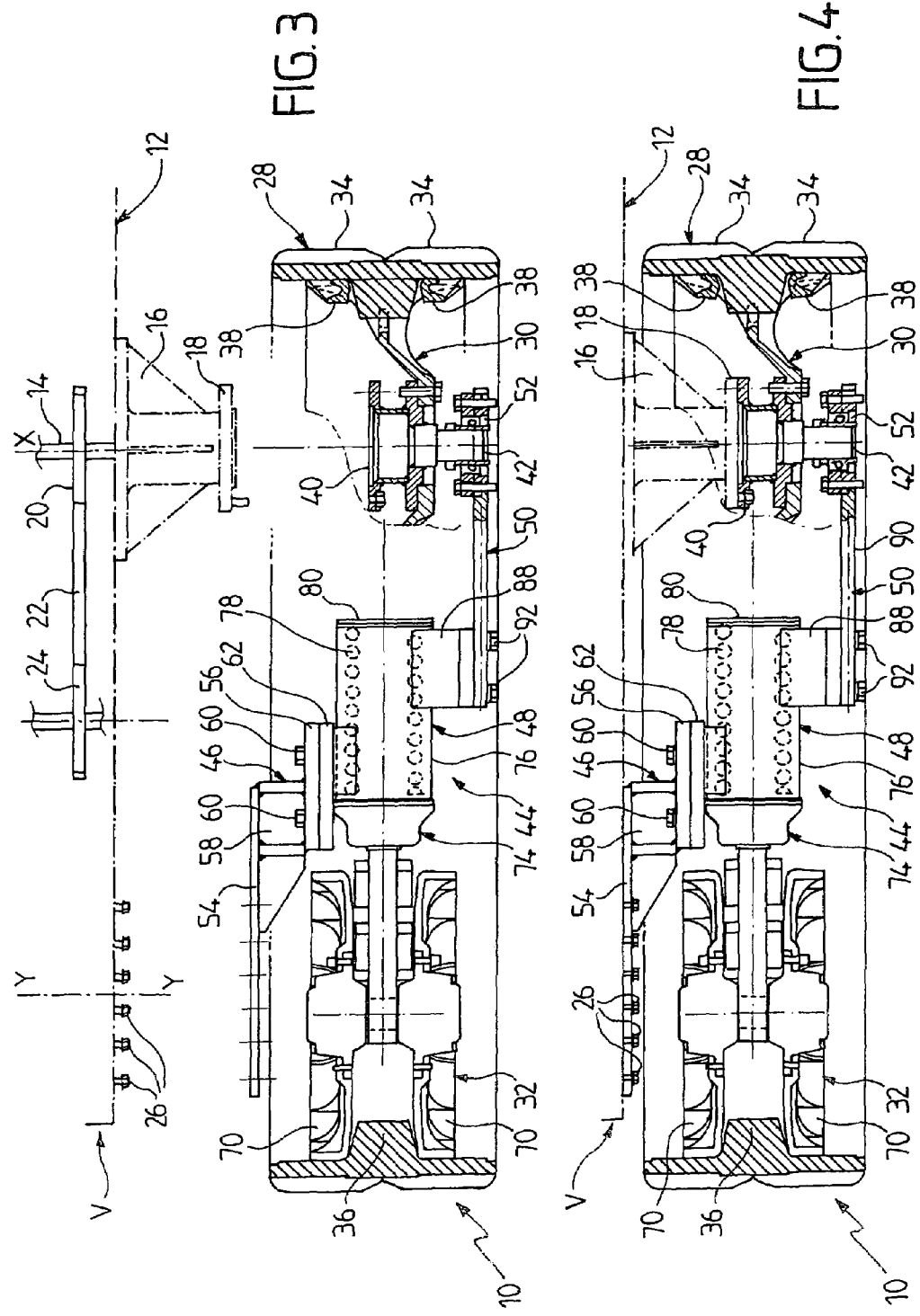

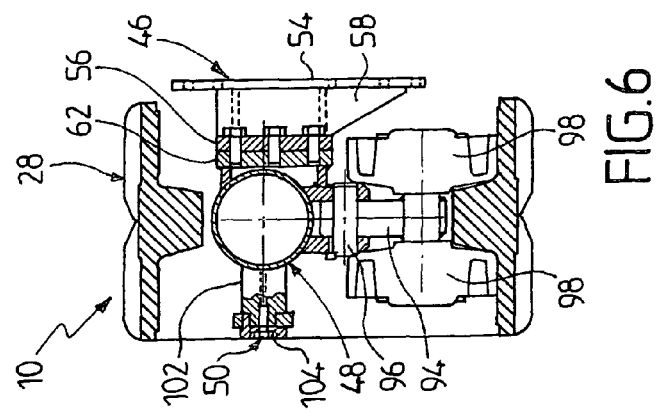
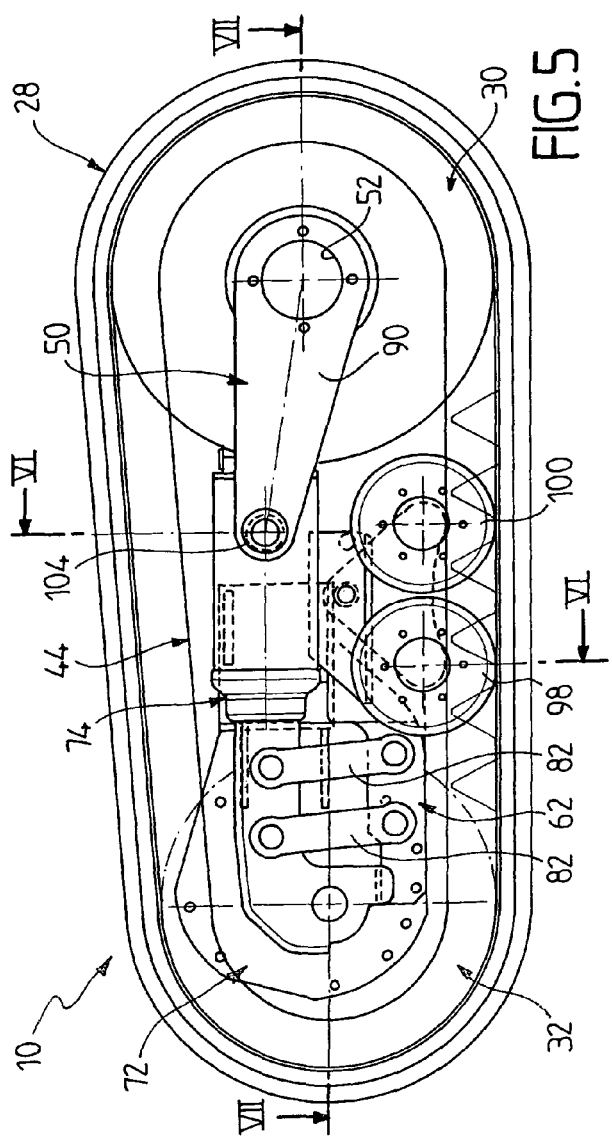
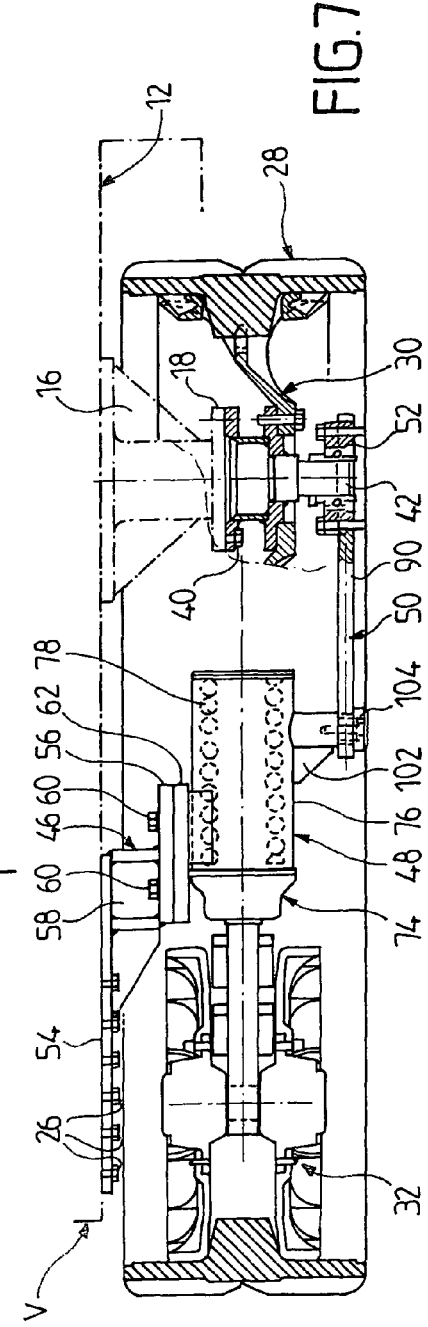

VEHICLE DRIVE DEVICE WITH FLEXIBLE CRAWLER AND VEHICLE THUS OBTAINED

The invention relates to motor vehicles, in particular all-terrain vehicles, such as agricultural, grape-harvesting, and oyster farming machinery, or public works and forestry machinery.

Vehicles of this type are usually fitted with wheels with tyres but the drawback of these is that they exert a lot of pressure on the ground and, therefore, compress it or create furrows or ruts, especially when they travel over loose terrain.

It is known that, to overcome this drawback, the standard tyres may be replaced by low pressure tyres which cause less pressure on the ground. These tyres, however, are bulkier than standard tyres and they increase the bulk of the vehicle, particularly widthways.

The vehicles in question may comprise, for example, a driving axle and a steering axle, or even a driving axle and a simultaneous driving and steering axle (4×4 vehicles).

There are also vehicles known as "mini loader" or "skid steer" vehicles which include four drive wheels mounted on two parallel axles, where the drive wheels of one side are driven in rotation independently of the drive wheels on the other side. With such vehicles, the four wheels are driven by chain mechanisms acting on the four wheels.

The two axles remain parallel to each other, and steering is effected by applying different rotation speeds, firstly, to the two wheels on one side, and, secondly, to the two wheels on the other side. Such vehicles are notably used as public works machines and have the advantage of having a very small lock, which allows them to turn almost on the spot.

Apart from vehicles fitted with wheels with tyres, there are also specific vehicles which from the start are fitted with crawlers, in particular flexible crawlers made from a rubber-like material, or similar. These vehicles with flexible crawlers are an improvement on vehicles with crawlers made of articulated links.

It has already been envisaged to transform vehicles fitted with wheels with tyres by fitting crawlers instead of, and in place of, their original wheels, as shown, for example, by U.S. Pat. Nos. 3,737,001, 3,863,726 and 3,939,930. In these known vehicles, the crawler replaces a drive wheel, while the vehicle usually retains its two steered wheels.

Such a solution requires a lot of adaptation, making it expensive, which means that the vehicles thus obtained do not have any substantial advantages over the vehicles originally fitted with crawlers.

The aim of the invention is, particularly, to overcome the aforementioned drawbacks.

It aims to provide a drive device with a flexible crawler capable of being adapted for a vehicle with a chassis and at least one drive shaft carrying a hub.

The invention also aims to provide such a drive device which is capable of being easily adapted for vehicles fitted with wheels with tyres, without requiring large changes.

It aims, in particular, to provide a drive device which is especially suitable for four-wheel drive vehicles with two parallel axles, particularly "mini loader" or "skid steer" vehicles referred to previously.

To this effect, the invention proposes a device of the aforementioned type, that includes a ready to fit unit, known as a "kit", which may be installed in a detachable manner on one side of the vehicle chassis, this unit comprising a flexible crawler mounted round a drive wheel adapted to be mounted on the hub and round a tension wheel carried by a support frame, the support frame carrying an internal part adapted to be mounted in a detachable manner on the chassis remote from the drive shaft, an intermediate part adapted to carry the tension wheel and an external part carrying a bearing for the drive wheel.

In this way a unit is obtained which is ready to install on one side of a vehicle chassis and which comprises a flexible crawler that is mounted round a drive wheel and a tension wheel. The drive wheel is mounted on a hub of the vehicle, while the tension wheel is carried by a support frame, mounted on the chassis, which furthermore ensures a reinforced structure forming a transaxle between the drive wheel and the tension wheel.

The installation of such a unit is particularly simple as it suffices, each time, to remove the wheels from one side of the vehicle, usually a drive wheel and another wheel, drive or not, possibly a steered wheel. Then the unit simply needs to be mounted on the side of the chassis by fitting the drive wheel of the crawler on the hub of the drive wheel that has been removed and securing the support frame to the vehicle chassis.

The transformation of the vehicle thus takes place under simple conditions and it has the added advantage of being reversible.

This means that it is possible, if the user ultimately so wishes, to remove the two units and put the original wheels and tyres back in place.

The support frame forms an essential part between the drive wheel and the tension wheel, whilst remaining attached to the vehicle chassis. The functions of this support frame are, notably, to protect the transmission, rigidify the transaxle and withstand the distortions associated with the pressure of the flexible crawler.

Preferably, the internal part of the support frame comprises an internal interface adapted to be secured on the vehicle chassis and an external interface provided to secure the intermediate part of the support frame. In particular, the internal part of the support frame may be fitted instead and in place of a hub support of the vehicle, which is therefore dismantled beforehand. On the other hand, the hub support, which supports the drive hub, remains in place to ensure that the drive hub remains supported, as the drive wheel driving the crawler is mounted on it.

Advantageously the external interface is mounted on the intermediate part in such a way that it can be dismantled to facilitate maintenance.

The intermediate part of the support frame preferably comprises a tensioning and damping mechanism acting on a wheel support carrying the tension wheel. This intermediate part of the support frame must be particularly strong to withstand the high pressure strain of the belt.

Furthermore, this intermediate part preferably comprises a beam integral with the tensioning and damping mechanism and a deformable connecting mechanism interposed between the beam and the wheel support. By way of example, this deformable connecting mechanism comprises two connecting rods, each articulated to the beam and the wheel support, forming a deformable quadrilateral.

The external part of the support frame forms an interface between the intermediate part and the drive wheel. It preferably comprises an arm having a first end intended to be mounted in a detachable manner on the intermediate part and a second end intended to receive the rolling bearing.

Different fitting methods are envisaged to ensure that the external part is secured on the intermediate part. Thus, the first end of the arm may be secured to the intermediate part by bolts; this provides a particularly strong connection.

In a variation, the first end of the arm is secured to the intermediate part by an eccentric. This allows the distance between the intermediate part and the drive wheel axle to be adjusted.

According to yet another characteristic of the invention, the device furthermore comprises at least one intermediate wheel carried by the support frame and arranged between the drive wheel and the tension wheel. In a preferable embodiment, the device comprises a bogie articulated on the support frame and carrying two intermediate wheels.

In another aspect, the invention concerns a vehicle fitted with at least one device as previously defined.

Here, the vehicle preferably comprises two units, fitted respectively on two sides of the chassis (right side and left side), intended to be driven by two hubs linked to two shafts of the same axle.

In the following description, given solely by way of example, reference is made to the accompanying drawings in which:

FIG. 1 is a side view of a drive device with a flexible crawler according to a first embodiment of the invention;

FIG. 2 is a cross section along the line II—II of FIG. 1;

FIG. 3 is a cross section taken along the line III—III of FIG. 1, showing the device before being fitted on a vehicle chassis;

FIG. 4 is a similar view to FIG. 3, showing the device once it has been fitted on the chassis;

FIG. 5 is a side view of a drive device with a flexible crawler according to a second embodiment of the invention;

FIG. 6 is a cross section along the line VI—VI of FIG. 5; and

FIG. 7 is a cross section along the line VII—VII of FIG. 5.

Joint reference is made, first of all, to FIGS. 1 to 3 which show a drive device 10 with a flexible crawler for a vehicle such as, for example, a four wheel drive vehicle of the "mini loader" or "skid steer" type.

The device 10 is made in the form of a ready to fit unit, known as a "kit", suitable for installing on the side, shown here as the left side of a chassis 12 (FIG. 3), of a vehicle V. Such a vehicle comprises a drive axle along the axis X—X, situated here at the back, and another drive axle along the axis Y—Y, situated here at the front, each carrying two wheels (not shown). The wheels on one side are driven in rotation independently of the wheels on the other side, without the need for a steering axle. This means that the axes of the two axles remain permanently parallel. The wheels are driven in rotation by suitable chain mechanisms.

As can be seen in FIG. 3, the rear axle comprises a drive shaft 14 (in reality a half shaft) which crosses a hub support 16 mounted on the side of the chassis 12 and on which a hub 18 is fixed for rotation, this hub forming a drive hub. On the shaft 14 is mounted a toothed wheel 20, on which a chain 22 is wound. This chain is also wound on another toothed wheel 24 driven in rotation by drive means (not shown).

To install the device 10 of the invention, the wheel with the tyre (not shown) which was originally mounted on the hub 10 has to be removed, as well as the hub support (not shown), from the front axle of the axis Y—Y. As a result, the corresponding hub and associated transmission (not shown) must also be removed. In these conditions, there remains a series of bolts 26 on the chassis 12, in the area of the front axle, that were originally used to secure the hub support. As will be seen later, these bolts 26 are going to be used for fitting the device 10 on the side of the chassis 12.

The device 10 comprises a flexible crawler 28 which is wound around a drive wheel 30 and a tension wheel 32. The flexible crawler 28 consists of a flexible belt loop preferably made from an elastomeric material, for example with a natural rubber base, internally reinforced with armatures. The belt loop externally comprises a driving surface provided with spikes 34 (FIGS. 2 and 3). The flexible belt loop is fitted internally with a row of blocks 36 (FIGS. 1 to 3) situated in the direction of the length of the belt and at a constant spacing. These blocks are of substantially pyramid shape, as described in French Patent FR-A-2 711 959 (93 13211) in the name of the applicant.

The wheel 30 is unitary and comprises two axially spaced rims 38 which form rolling tracks for the crawler and provide a passage for the blocks 36 of the crawler (FIG. 3). Drive lugs (not shown) are arranged between the rims to engage in the empty spaces 10 defined between the blocks 36 to drive the crawler.

The two rims 38 are mounted on a support 40, known as a "trumpet", intended to be secured to the hub 18, instead and in place of the wheel and tyre originally fitted on the vehicle V. The support 40 is adapted each time according to the type of hub to be used so that it may be secured thereon and it is externally extended by a pivot 22 which rotates with it.

The device of the invention furthermore comprises a support frame indicated in its entirety by the reference 44 and which, seen from above, substantially forms an S shape with flattened arms. The support frame 44 basically comprises three parts connected in a detachable manner, that is an internal part 46 adapted to be mounted in a detachable manner on the chassis 12 remote from the drive shaft, an intermediate part 48 adapted to carry the tension wheel 32 and an external part 50 carrying a bearing for the drive wheel 30.

The internal part 46 comprises an internal interface 54, in the form of a plate, which is secured on the vehicle chassis by the aforementioned bolts 26. In the fitting position (FIG. 4), the interface 54 remains flat against the left side of the chassis and is firmly connected to the latter by the bolts 26. Furthermore, the internal part 46 comprises an external interface 56 in the form of a plate which extends parallel to the internal interface 54 and which is connected to the latter by a strut 58. In the example, the interfaces 54 and 56 as well as the strut 58 which form the internal part 46, are metal parts assembled and welded together. However, the internal part 46 could be unitary, and cast in one piece.

The intermediate part 48 is secured in a detachable manner on the interface 56 by means of bolts 60 and its main function is to support the tension wheel 32. It comprises a beam 62 which can be better seen in FIG. 1, and which is directly mounted on the interface 56 by the bolts 60.

As can be seen in FIGS. 3 and 4, the tension wheel 32 has an axle 68 carrying two separate flanges which form the rolling track for the crawler and allow the passage of the blocks 36 of the crawler. The axle 68 is mounted, by the use of bearings, on a wheel support 72 which is movably mounted relative to the beam 62.

The wheel support 72 is connected to a tensioning and damping mechanism indicated in its entirety by the reference 74. This tensioning and damping mechanism is interposed between the beam and the wheel support to ensure that the crawler is put under tension. This mechanism comprises a cylinder 76 secured longitudinally and externally to the beam 62. The cylinder is crossed by a rod (not shown) connected to the wheel support and attached to an actuator (not shown). A helical spring 78 surrounds the rod and abuts against a cup 80.

The wheel support 72 is connected to the beam 62 by a mechanism with a deformable connection which comprises two connecting rods 82 (FIG. 1) each articulated to the beam 62 by a first joint 82 and to the wheel support 72 by a second joint 86; this forms a deformable quadrilateral. A mechanism with a deformable connection of this type is described in French Patent application No. 00 13459 filed on $20^{th}$ Oct. 2000 in the name of the applicant. As a result, the wheel support 72 may be moved forwards or backwards relative to the beam 62, while being guided relative to the latter, and being urged by the tensioning and damping mechanism, to ensure that the crawler is put under tension.

The cylinder 76 carries a flange 88 (FIGS. 2, 3 and 4) on which the external part 50 of the support frame is mounted in a detachable manner. This external part is in the form of an arm 90 with a first end secured in a detachable manner to the flange 88 by means of bolts 92, six in the given example, as can be seen in FIG. 1. These bolts cross elongated holes (not shown) in the arm 90 to enable it to be adjusted. The arm 90 has another end which supports the bearing 52 that co-operates with the pivot 42 (FIGS. 3 and 4).

In this way, the support frame 48 fulfils several functions. It allows the device to be fitted on the vehicle chassis. It protects the transmission and rigidity of the transaxle between the drive wheel and the tension wheel. The support frame also helps prevent distortions associated with the pressure of the crawler.

It should be noted that the internal part 46 may remain permanently on the chassis while the rest of the support frame (the intermediate part 48 and the external part 50) is being dismantled. This assists the partial dismantling of the device, for example for maintenance purposes.

The device 10 furthermore comprises another bogie 94 articulated by a pivot 96 on the support frame and supporting, in the example, two intermediate wheels 98 and 100 (FIG. 1) situated between the drive wheel and the tension wheel in such a way as to provide support for the crawler. In a variation, the device could include more than two intermediate wheels.

It will be understood that the vehicle V is fitted, on the opposite side (here, the right side) with a similar device, where the drive wheel may be driven in rotation independently of the device 10 situated on the left side.

The embodiment in FIGS. 5 to 7 closely resembles that of the preceding Figures. The main difference is in the fact that the support arm 90 forming the external part 50 is secured in a detachable manner to the cylinder 76 in a different way. The cylinder 76 carries a flange 102 on which the front end of the arm 50 is secured by means of an eccentric mechanism. This allows the distance between the pivot 42 and the flange 102 to be adjusted. Of course, this fitting is not as strong as the fitting with bolts 92 as in the previous embodiment.

The device of the invention may be made with several ranges of length according to the length of the original vehicle chassis.

Numerous variations can be made according to the structure of these different components.

Furthermore, the device of the invention may be adapted to different types of vehicle, and is not restricted to a vehicle of the of "mini loader" or "skid steer" type as previously described.

What is claimed is:

1. Drive device with for a vehicle comprising a chassis having a first side and a second side, at least one drive shaft operably attached to said chassis, a supporting hub disposed at one end of said at least one drive shaft, comprising:

a ready to fit unit detachably installed on either said first side or said second side of said chassis, a support frame comprising an internal part removably attached to said chassis away from said at least one drive shaft, an intermediate part attached to said internal part, and an external part attached to intermediate part, a drive wheel removably mounted on said supporting hub of said drive shaft and having a bearing disposed on said external part, a tension wheel supported by said intermediate part, and, a flexible crawler wound around said drive wheel and said tension wheel.

2. Device according to claim 1, wherein said internal part of said support frame comprises an internal interface for securing on said vehicle chassis and an external interface adapted to secure said intermediate part of said support frame.

3. Device according to claim 1 wherein said intermediate part of said support frame comprises a tensioning and damping mechanism acting on a wheel support which supports said tension wheel.

4. Device according to claim 1, wherein said external part of said support frame comprises an arm having a first end detachably secured to said intermediate part and a second end for receiving a rolling bearing.

5. Device according to claim 4, wherein said first end of said arm is secured by bolts on said intermediate part.

6. Device according to claim 1, including at least one intermediate wheel carried by said support frame and arranged between said drive wheel and said tension wheel.

7. Device according to claim 6, including a bogie articulated on said support frame and carrying two said intermediate wheels.

8. Vehicle fitted with at least one device according to claim 1.

9. Vehicle according to claim 8, including two units, one of said units being mounted respectively on each side of said chassis and adapted to be driven by respective drive hubs connected to respective shafts of the same axle.

10. Drive device with a flexible crawler for a vehicle with a chassis and at least one drive shaft supporting a hub, said device comprising a ready to fit unit for installing in a detachable manner on one side of said chassis, said unit comprising a flexible crawler wound around a drive wheel adapted for mounting on said hub and around a tension wheel carried by a support frame, said support frame comprising an internal part adapted for securing in a detachable manner on said chassis remote from said drive shaft, an intermediate part adapted for carrying said tension wheel and an external part carrying a bearing for said drive wheel, wherein said intermediate part of said support frame comprises a tensioning and damping mechanism acting on a wheel support which supports said tension wheel, wherein said intermediate part of said support frame furthermore comprises a beam integral with said tension in and damping mechanism and a mechanism with a deformable connection interposed between said beam and said wheel support.

11. Device according to claim 10, wherein said mechanism with the deformable connection comprises two connecting rods, each said connecting rod being articulated to said beam and to said wheel support, to form a deformable quadrilateral.

* * * * *